United States Patent

[11] 3,626,487

| [72] | Inventor | Edward A. Seiz |
| | | 136 E. Third St., Lansdale, Pa. 19446 |
| [21] | Appl. No. | 15,998 |
| [22] | Filed | Mar. 3, 1970 |
| [45] | Patented | Dec. 7, 1971 |
| | | Continuation-in-part of application Ser. No. 728,182, May 10, 1968, now Patent No. 3,545,626. This application Mar. 3, 1970, Ser. No. 15,998 |

[54] FIRE AND VERMIN RESISTANT STORAGE STRUCTURE HAVING FAIL-SAFE FEATURES
8 Claims, 14 Drawing Figs.

[52] U.S. Cl. ................................................... 211/176, 169/2
[51] Int. Cl. ........................................................ A47f 5/10
[50] Field of Search ........................................ 211/176, 177, 148 R, 148 A; 248/243, 239, 223; 287/189.36 C, 189.36, 20.924–20.927; 24/221 R, 221 K, 211 R; 85/5 R, 8.8; 169/2

[56] References Cited
UNITED STATES PATENTS

| 3,512,653 | 5/1970 | Erismann | 211/176 |
| 3,219,157 | 11/1965 | Gordon | 287/189.36 R |
| 3,362,672 | 1/1968 | Wigam | 85/5 R X |
| 3,468,430 | 9/1969 | Lawman | 211/177 X |
| 1,963,951 | 6/1934 | Bowers | 220/3.92 |
| 3,174,592 | 3/1965 | Berman et al. | 211/148 X |
| 3,303,937 | 2/1967 | McConnell | 211/176 X |
| 3,392,848 | 7/1968 | McConnell et al. | 211/176 |
| 3,414,224 | 12/1968 | Robilliard et al. | 211/176 X |

Primary Examiner—Ramon S. Britts
Attorney—Howson and Howson

ABSTRACT: A free-standing storage structure comprising uprights and a series of load-carrying beams releasably secured to the uprights by means of improved locking assemblies on the ends of the beams projecting through knockout openings spaced apart along the length of each upright. Fire protection for the structure is provided by means of a wet upright having a conduit which contains a fire-retardant substance and which forms a structural component of the upright, the conduit being connected to pipes extending across the back of the structure for discharging the fire-retardant substance in response to a fire. Coupling means is provided to interconnect the conduits of aligned uprights when the structures are stacked vertically. Unused openings are closed by knockouts and the ends of the uprights and beams are closed to prevent vermin from inhabiting the storage structure.

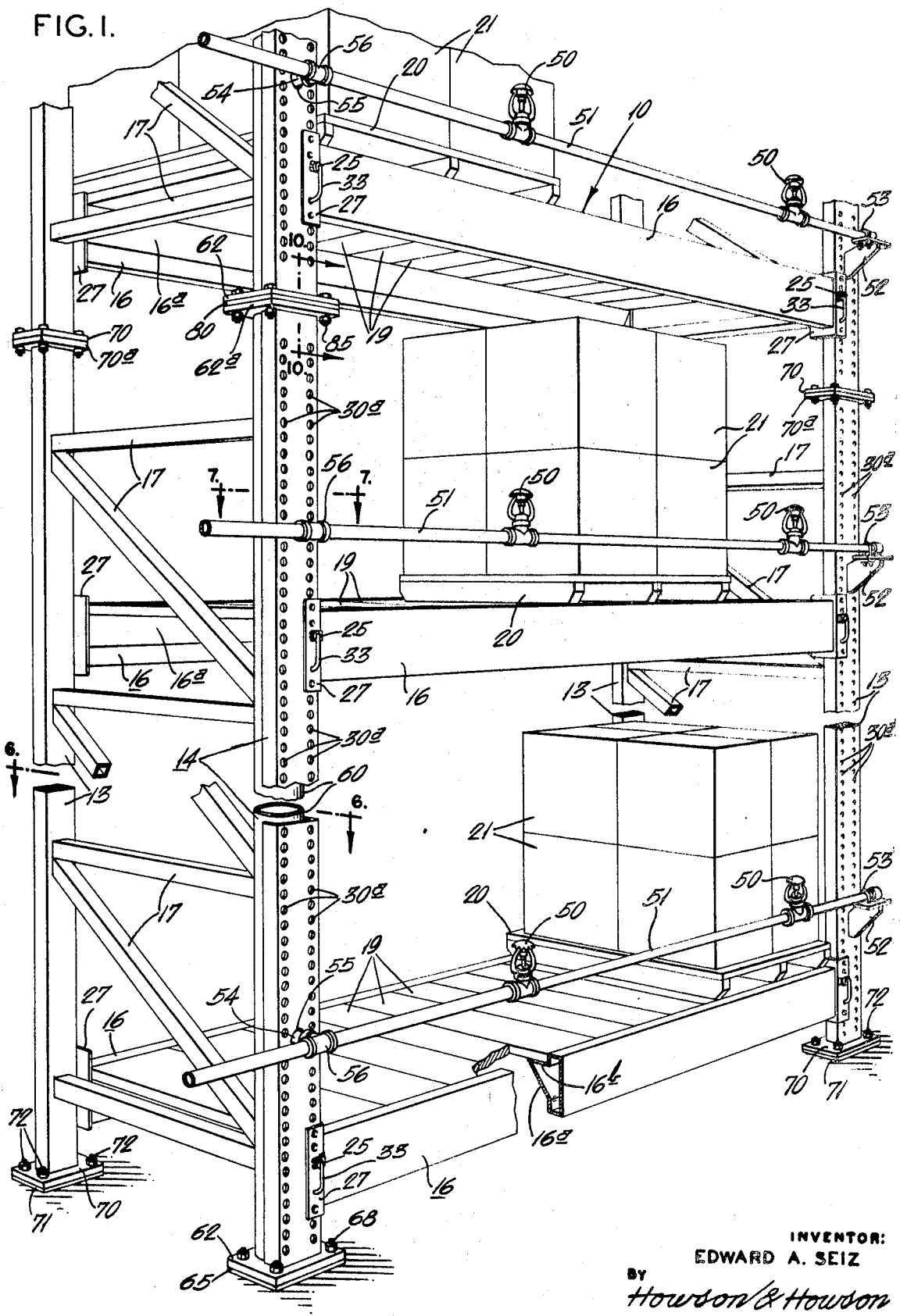

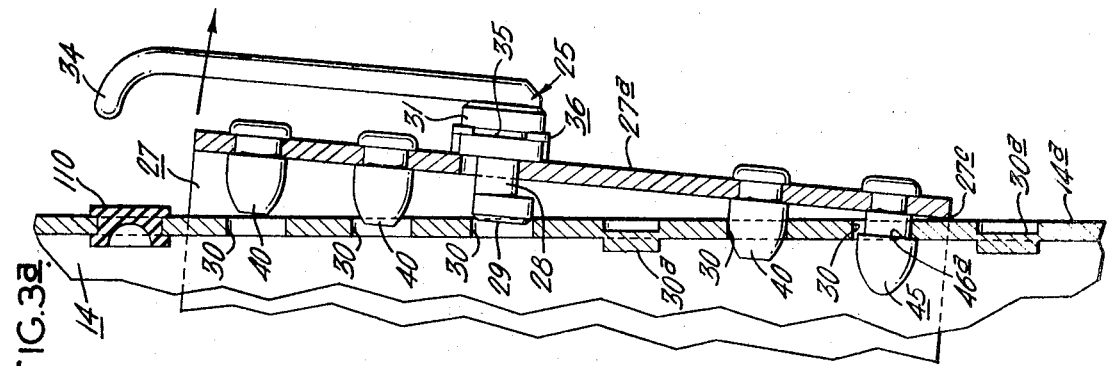
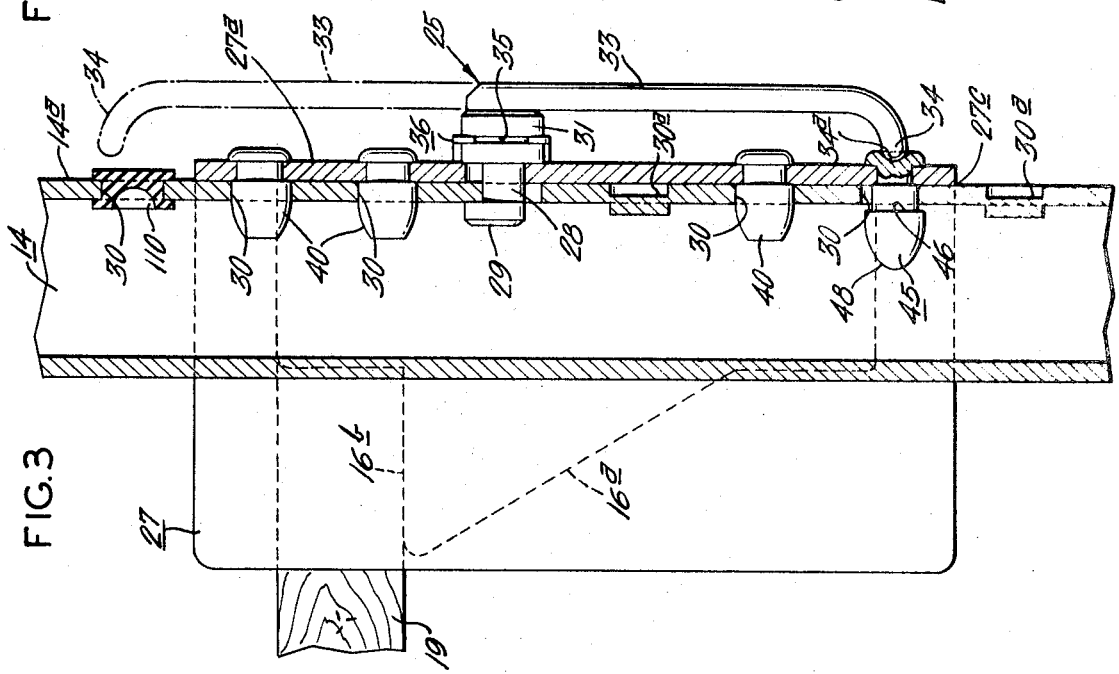
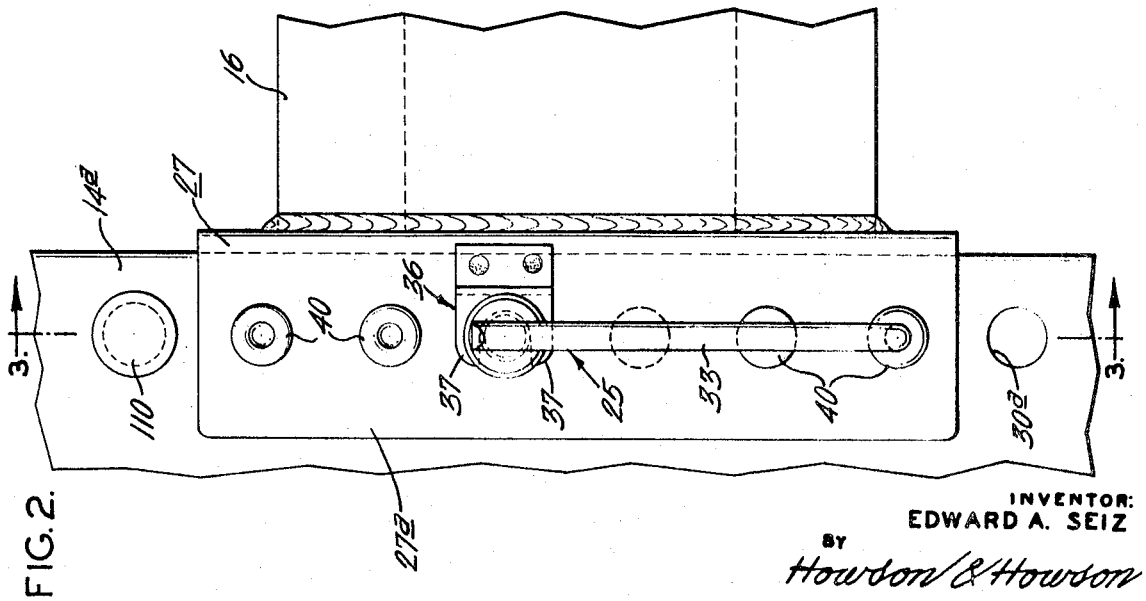

INVENTOR:
EDWARD A. SEIZ
BY
Howson & Howson
ATTYS.

FIRE AND VERMIN RESISTANT STORAGE STRUCTURE HAVING FAIL-SAFE FEATURES

The present application is a continuation-in-part of my copending application Ser. No. 728,182, filed May 10, 1968, and entitled "Storage Structure," now U.S. Pat. No. 3,545,626.

The present invention relates to storage structures particularly for use in warehouses.

The aforementioned pending application discloses a storage structure having load-carrying beams releasably secured to upright members by means of locking assemblies mounted on extensions on opposite ends of the beams. Each of the locking assemblies has a series of bearing pins projecting into holes spaced apart vertically along the outwardly facing webs of the upright members and each has a locking device with an eccentrically offset head on one end which projects through one of the holes intermediate the pin-receiving holes. The locking device is operable upon rotation to engage the interior of the web and lock the beams thereto. This storage structure has been entirely satisfactory; however, it has been noted that there may be a tendency for the pins below the key to pull away from their receiving apertures when the beams are twisted by an eccentrically applied load. As a result, stress on the other pins is increased, thereby reducing the allowable capacity of the structure.

The aforedescribed storage structure normally requires a workman to be stationed at each end of the beams for aligning the bearing pins and locking devices in their respective holes. After proper alignment is effected, the beam is locked in place when each workman rotates the locking device on his end of the beam. The reverse procedure takes place when disassembling the structure. Thus, in the interest of economy of labor, it is desirable to have a knockdown storage structure which could be easily assembled or disassembled by a lone workman.

Vermin control has always been a problem for warehousemen, particularly when storing food products. One of the reasons for this problem is the existence of openings and corners in storage racks in which vermin may live safely without being subject to extermination by toxic sprays or the like. Thus, a storage structure which is resistant to inhabitation by vermin is highly desirable.

In addition to the problem of vermin control, warehousemen must be continuously concerned about fire. Presently, many warehouses have sprinkler systems for dispersing water or fire-retardant chemicals in the vicinity of a fire when it occurs. In order for the sprinkler system to be most effective, however, it is desirable for the sprinkler heads to be located in close proximity to the fire so that the water or chemical can be sprayed directly thereon without interference by shelving which tends to deflect the flow of fire-extinguishing fluid. Accordingly, a storage structure which promotes the distribution of fire-extinguishing fluid is also desirable.

In view of the foregoing, it is a primary object of the present invention to provide improved means for releasably securing beams to uprights in portable storage structures to thereby increase the safety of the structure.

It is another object of the present invention to provide a novel storage structure which is resistant to inhabitation by vermin.

It is a further object of the present invention to provide a unique storage rack structure which facilitates the distribution of a fire-extinguishing substance in the vicinity of the structure in response to a fire.

As a still further object, the present invention provides an improved rack structure which is economical to assemble and disassemble.

More specifically, the present invention provides a storage structure which comprises end frames each having a pair of uprights connected together by bracing and a series of vertically spaced load-carrying beams extending horizontally between the frames. The ends of each beam are releasably secured to their associated uprights by means of a locking device providing a primary locking action which normally secures the beam to the upright and a secondary locking action which operates upon eccentric loading of the beam to insure that the ends of the beam do not become disassociated from the uprights. The primary locking action is provided by a keylike device which is journaled on the front flange of a clip extending outwardly on the end of the beam, the device extending through an open one of a series of vertically spaced knockout openings in the face web of the upright and having an eccentrically offset head engaging the interior of the web upon rotation. The secondary locking action is provided by means of a shouldered pin spaced from the locking device and extending through another opening in the face web, the shouldered pin being located with respect to the locking device and the edge of the opening to cause its shoulder to engage the interior of the web when the beam is twisted on its longitudinal axis by an eccentric load. Fire protection is provided for the structure by means of a wet upright having a conduit extending between plates mounted on opposite ends thereof. The conduit contains a fire-retardant substance which is dispersed in the vicinity of the rack in response to a fire by means of heads mounted on pipes extending laterally outward from the upright and connected to taps located at spaced intervals in the conduit. Coupling means is also provided to connect the conduit to a pressurized supply of the fire-retardant substance. In order to prevent vermin from infiltrating and inhabitating the rack, knockout means are provided to close unused holes in the uprights, and the ends of the beams and uprights are also closed.

These and other objects, features and advantages of the present invention should become apparent from the following description when taken in conjunction with the accompanying drawings in which:

FIG. 1 is a perspective view, with portions broken away, of the back of a storage structure embodying the present invention, the structure having uprights, and beams with adjacent uprights being interconnected by bracing to form end frames;

FIG. 2 is an enlarged, fragmentary face view of means for releasably securing one end of a beam to its associated upright;

FIG. 3 is a sectional view taken along line 3—3 of FIG. 2;

FIG. 3a is a view similar to FIG. 3 but showing the beam and its securing means tilted with respect to the upright during assembly or disassembly of the structure;

Figure 7:
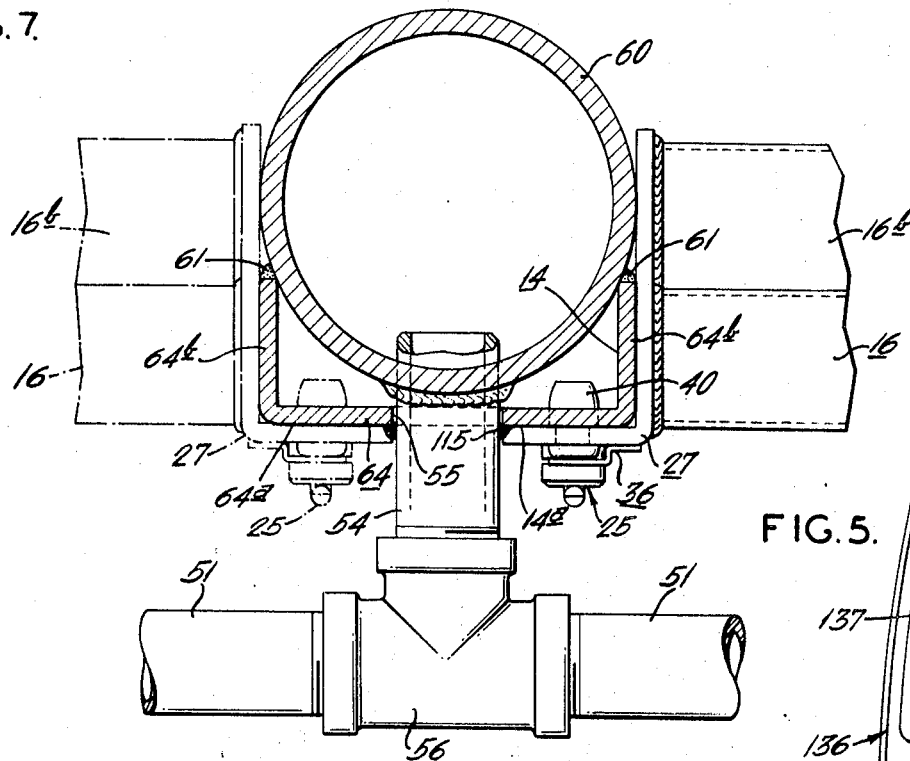
FIG. 7 is an enlarged fragmentary sectional view of the wet upright taken along line 7—7 of FIG. 1.

Referring now to the drawings, there is illustrated in FIG. 1 the rear of a storage structure or rack 10 embodying the present invention. In the present instance, the structure comprises three dry uprights 13, one wet upright 14, and beams which extend horizontally between the uprights 13 and 14. The uprights at each end of the structure are connected together in spaced relation by means of bracing 17 extending both horizontally and diagonally between adjacent columns to thereby provide a free-standing structure. In addition, plank means 19 spans across the beams 16 for supporting pallets 20 carrying load materials, for example, boxed foodstuffs 21.

When the structure is to be used for storing rolls of carpeting or the like, it is preferable for the plank means to include inverted channel members having out-turned flanges on opposite sides and coextensive in length therewith and mounted at spaced intervals on the beams 16. In such a situation, the channel members may be secured to the beams 16 by means of angle members having tongues struck upwardly and being mounted on a lip 16b on each beam to engage the out-turned flanges of the channel members.

As may be seen in connection with the lowermost rear beam in the foreground of FIG. 1, the beams 16 have an irregular cross section defined by a downwardly offset portion 16a forming the lip 16b for receiving the ends of the planks 19. Thus, when the structure is loaded as shown in FIG. 1, that is, with the entire load being applied on the planks 19 between the beams 16, a moment is applied to the beams, tending to twist the beams on their longitudinal axes. For example, the front beam in the background of FIG. 1 is torqued clockwise and the back beam 16 in the foreground is torqued counterclockwise. As a result, the bottoms of the beams may tend to spread apart and urge the clips to disengage the uprights, thereby adversely affecting the integrity of the structure.

The present invention eliminates the foregoing disadvantages by providing a storage structure possessing features which, in addition to contributing to the safety of the structure, facilitate its erection. To this end, each of the beams in the structure is secured at its ends to the uprights by a locking arrangement which provides a primary and a secondary locking action, the primary locking action normally operating to releasably secure the beams to the uprights and the secondary locking action operating to prevent the beams from inadvertently disengaging the columns when the beams are twisted by eccentrically applied loads.

As described in my aforementioned patent application, and as illustrated in FIGS. 2–3a of the present application, the primary locking action is provided by means of locking devices 25 carried on clips 27 secured to the ends of the beams 16. The clip 27 has a front flange 27a which engages the face web 14a on the upright and which mounts a series of bearing pins 40, the pins projecting into the upright through vertically spaced access means or holes 30 in the web 14a. The locking device includes a shank 28 rotatable in a bore in the clip 27, a head 29 offset eccentrically from the shank 28 to engage the inside of the web 14a upon rotation of the shank, and a base portion 31 on the shank for engaging the outside of the clip 27. The locking device also has an arm 33 with an inturned free end portion 34 releasably engaged by keeper means, in the present instance a recess 34a in the lowermost pin 45 in the series. With this structure, the beams may be readily connected to and disconnected from the uprights when the arm 33 is rotated and the clip 27 is displaced toward or away from the face of the web 14a. It is to be noted that the arm 33 in the present application is longer than the corresponding arm in my aforementioned application to enable its free end 34 to clear the top edge of the clip 27. The weight of the arm tends to cause the locking device to remain in its operative locking position.

In accordance with the primary object of the present invention, means is provided to effect a secondary locking action on the ends of each beam to prevent the beams from becoming inadvertently disassociated from the uprights when they are torqued on their longitudinal axes by eccentrically applied loads. In the present instance, the secondary locking action is provided by means of a shouldered locking-pin 45 (FIGS. 3 and 3a) projecting forwardly through one of the holes 30 from the front flange 27a of the clip 27. As may be seen in FIG. 3, the locking-pin 45 is the lowermost pin in the series, and it has a rearwardly facing annular surface or shoulder 46 extending inwardly from the periphery of its rounded head 48. The holes 30 and the bearing pins 40 engaging snugly therein are located at equally spaced distances in their respective members; however, in the present invention, the spacing between the locking-pin 45 and its adjacent bearing pin 40 is greater than the normal pin spacing by an amount substantially equal to the radial dimension of the shoulder 46. As a result, the lower portion of the shoulder 46 confronts the inside of the web 14a when the beam is locked onto the upright as illustrated in FIG. 3 with the upper pins snugly engaged in the openings 30, so that when the beam 16 is twisted in the counterclockwise direction, the shoulder 46 engages the inside of the web 14a to thereby prevent the lower portion of the clip 27 and hence the beam 16 from disengaging the upright. In this manner, a full complement of bearing pins 40 is always available for transmitting the beam-load to the end uprights, and the safety of the structure is thereby increased.

According to another object of the present invention, means is provided to prevent the locking device 25 from inadvertently disengaging the clip 27. For this purpose, a retainer 36 is mounted on the face of the clip 27 and engages the locking device 25. In the embodiment illustrated in FIGS. 2–3a, the retainer 36 has a bifurcated end portion 37 which engages in a groove 35 in the base 31 of the locking device 25. The retainer 36 is spot welded to the clip with its bifurcated end disposed horizontally to limit vertical or transaxial displacement of the shaft 28 in its bore. Axial displacement of the locking device 25 relative to the clip 27 is also limited, so that after the head 29 of the locking device has been inserted through the bore and the retainer welded into position, the locking device 25 is permanently secured to the clip 27.

Figure 5:
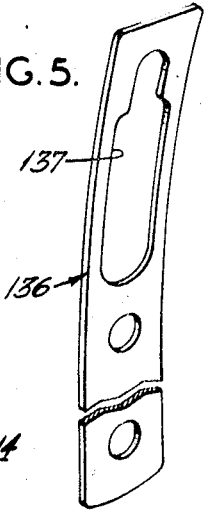
FIG. 5 is a perspective view of a retainer element associated with the beam-securing means of FIG. 4 for maintaining the locking device in releasable engagement therewith.
Figure 4:
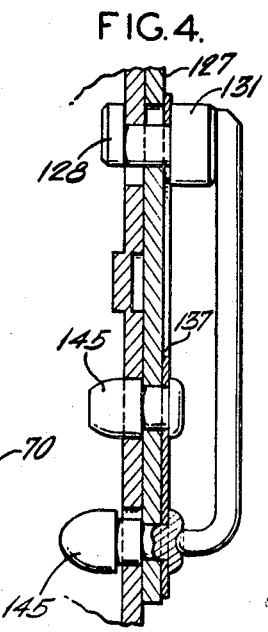
FIG. 4 is a fragmentary view similar to FIG. 3 of a modified embodiment of the beam-securing means.

In another embodiment of the present invention, modified means is provided to prevent inadvertent disengagement of the locking device 25 from the clip 27 but to permit intentional disengagement therefrom, for example, when it is desired to remove and replace locking devices. To this end, a modified retainer 136, in the present instance a flat, elongated spring element (FIGS. 4–5, Sheet 3) is mounted on the front face of a clip 127 by locking pins 145 which extend through the lower part of the spring element 136 and which have thin outer ends upset against the outside of the spring element. The spring element 136 has a bifurcated end portion in the form of a keyhole slot 137 which engages diametrically opposite sides of the shank 128 and between the front of the clip 127 and the inside of the base portion 131 of the locking device. The spring element 136 is sufficiently flexible to enable the locking device to be displaced axially away from the clip 127, and the keyhole slot 137 at the top of the spring element 136 enables the locking device to be displaced vertically downward or transaxially to effect complete disengagement of the locking device from its mounting clip 127. Thus, with this structure, removal and replacement of the locking devices may be accomplished in a simple manner.

Figure 4A:
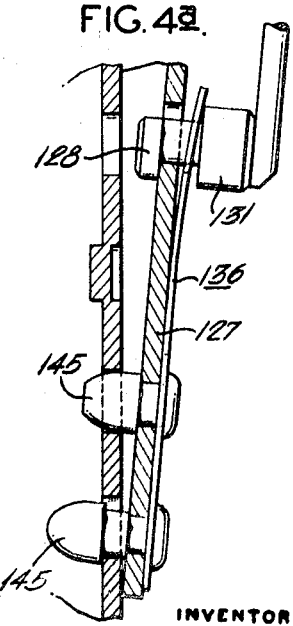
FIG. 4a is a fragmentary view similar to FIG. 3a of the beam-securing means of FIG. 4.

In addition to providing a rack having fail-safe locking features, the locking assemblies of the present invention facilitate the erection of the rack. As noted heretofore, more than one workman is normally required to effect connection and disconnection of the beams to and from the uprights in the structure described in my aforementioned patent application. According to the present invention, however, a locking assembly is provided which enables one workman to mount and dismount the beams by loosely engaging the clips on the ends of the beams with the uprights to support the beams so that he may proceed to serially actuate the locking assemblies. For this purpose, the front flange 27a of the clip 27 (FIGS. 2, 3 and 3a) depends below the locking-pin 45 and terminates in an inner edge 27c which extends parallel to the bottom of the beam 16. Thus, when the beam 16 and clip 27 are inclined at an acute angle with respect to the column, as illustrated in FIG. 4a, the surface 46a on the locking-pin 45 and the edge 27c on the clip 27 engage respective opposite sides of the web 14a of the upright 14 to thereby effect a secure but temporary holding action. In this manner, the workman may loosely engage the beams with the uprights when mounting or for dismounting the beams, for example, in order to change their elevation or to disassemble the rack structure.

As noted heretofore, some storage structures may tend to interfere with the distribution of fire-extinguishing water or chemicals by warehouse sprinkler systems. However, according to the present invention, an improved storage structure is provided having at least one wet upright 14 with dispersing means which promotes the distribution of fire-retardant substances at spaced intervals on a storage structure. In the present instance, the fire-retardant substance is water and the dispersing means includes sprinkler heads 50 (FIG. 1) mounted in spaced relation on passage means or pipes 51 extending between the uprights. If the fire-retarding substance is a chemical liquid or powder, another type of sprinkler head may be employed. One end of each pipe 51 is supported on one of the dry uprights 13 by means of a bracket 52 welded or otherwise secured to the upright 13 for mounting an inverted U-bolt 53 which clamps the end of the pipe thereto. Each pipe 51 is connected at its other end to a tap 54 (FIG. 7, Sheet 3) protruding through an opening 55 in the web 14a of the wet upright 14. The pipe 51 is connected to a tap 54 by a tee 56, as illustrated in FIGS. 1 and 7, to thereby provide fire protection for adjacent storage structures; however, in some installations, short lateral pipe runs may provide adequate protection, thereby eliminating the need for brackets to support the long pipe runs as are present in the illustrated embodiment.

Figure 6:
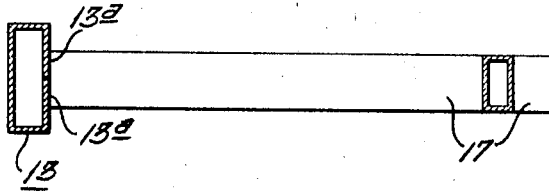
FIG. 6 is a cross-sectional view taken along line 6—6 of FIG. 1 showing a dry and a wet upright.

In order to supply the water to the tape 54, a conduit 60 is provided which forms a structural component of the upright 14 on the back of the structure. As may be seen in FIG. 6 (Sheet 3), the wet upright 14 is formed with the conduit 60 by a channel element 64 of U-shaped cross section with a pair of flanges 64b integral with its web 64a. The conduit 60 is preferably formed of steel tubing and is secured to the flanges 64b by means of weldments 61 coextensive in length therewith. Thus, the conduit 60 cooperates with the channel element 64 to form a closed tubular upright having substantial strength.

It is to be noted that each of the dry uprights 13 has a rolled rectangular cross section with inturned portions or lips 13a which are secured in edgewise abutting relation by means of the bracing 17 to form a closed tubular upright. The slight gap which may exist between the edges of the abutting lips 13a is readily bridged by a sealing agent, which in the present instance is paint applied on the exterior of the uprights.

Figure 8:
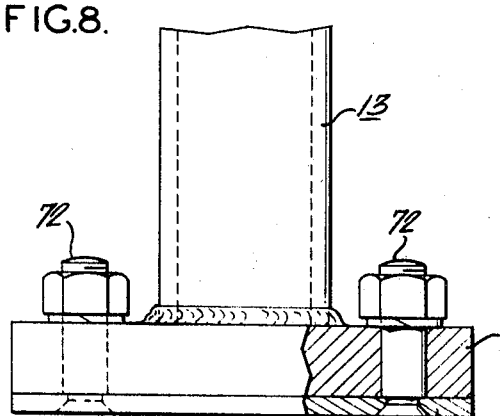
FIG. 8 is an enlarged, partially sectioned end view of the bottom of one of the dry uprights.
Figure 9:
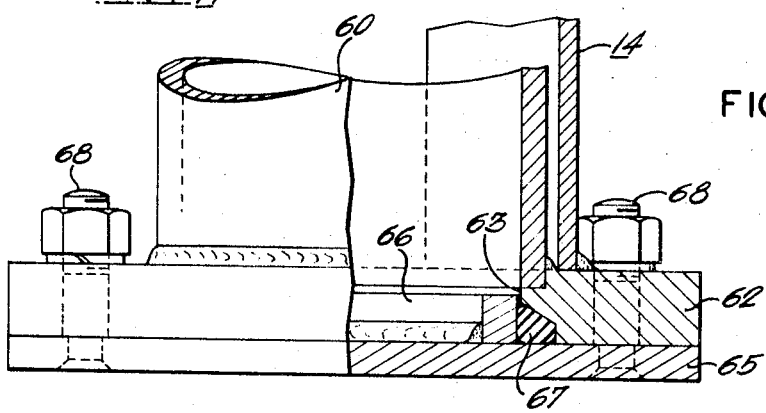
FIG. 9 is an enlarged, partially sectioned end view of the bottom of the wet upright containing a fire-retardant substance.

The bottom of the wet upright 14 terminates in a flange plate 62 welded thereacross and having a passageway 63 in registry with the bore of the conduit 60. A bearing plate 65 is connected to the flange plate by means of bolts or studs 68 (See FIGS. 1 and 9, Sheets 1 and 4) to positively seal the conduit. The plate 65 has a cylindrical insert 66 engaged in the passageway 63 and sealed therein by a compressed O-ring 67. The three dry uprights are similarly closed on their bottom ends by a flange plate 70 and are connected to a bearing plate 71 by bolts or studs 72 projecting upwardly from the plate 71 (See FIG. 8). It is to be noted that the thickness of the bearing plate 65 is greater than that of the bearing plate 71, the reasons for which should become apparent hereinafter.

Figure 11:
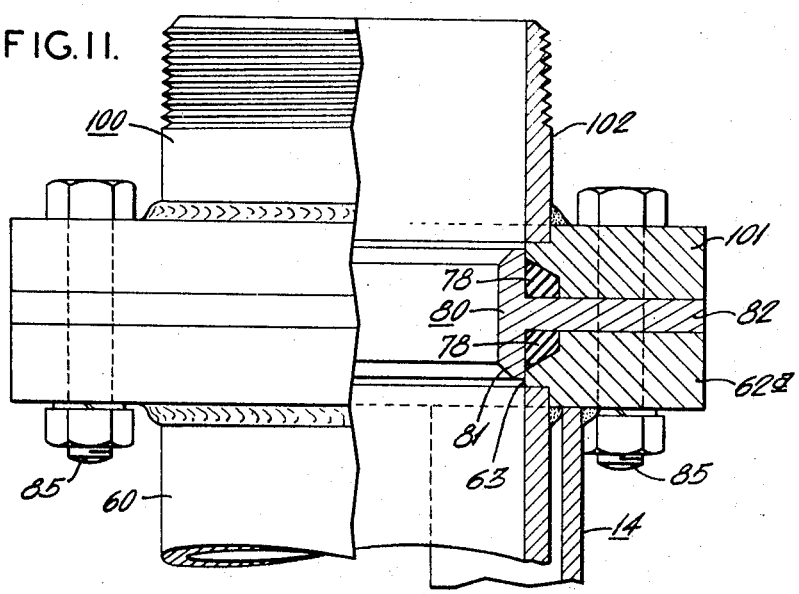
FIG. 11 is a similar view showing a coupling fixture for connecting the upper end of the wet upright to a pressurized source of fire-retardant substance.
Figure 12:
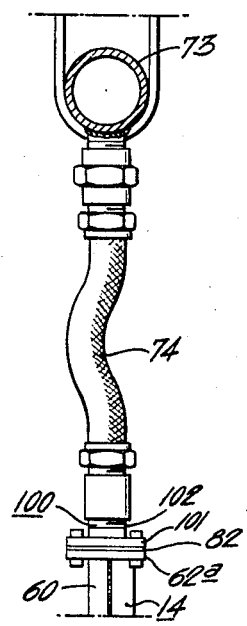
FIG. 12 is a reduced side elevational view illustrating a flexible connection between the coupling of FIG. 11 and a pressurized source of the fire-retardant substance.
Figure 10:
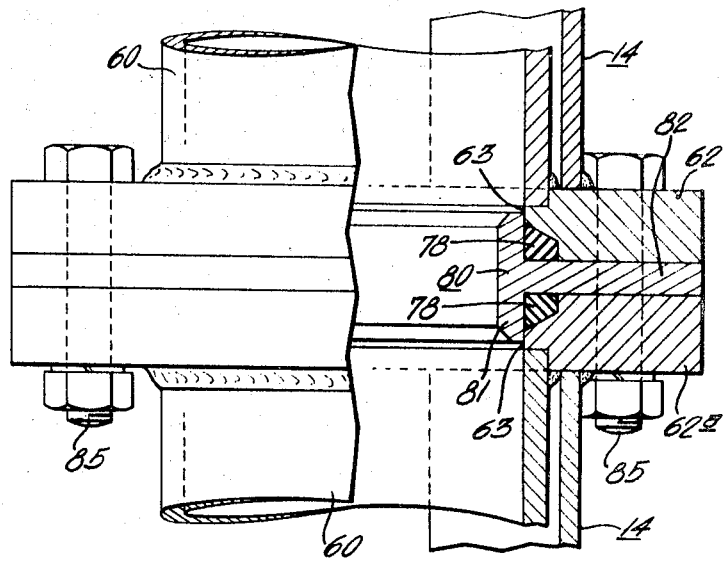
FIG. 10 is an enlarged, partially sectioned view as seen from the line 10—10 showing a coupling fixture for stacking the wet uprights.

In accordance with the present invention, coupling means are provided to permit the structures to be stacked vertically and coupled together in tiers and to connect the wet uprights to a supply of water under pressure or other suitable fire-retardant, as illustrated in FIG. 12. To this end, the tops of the uprights 13 and 14 have upper flange plates 70a and 62a adapted to mate with the bottom flange plates. When stacked, the flange plates 70 and 70a are bolted together in flush engagement and the plates 65 and 65a are connected with an insert 80 disposed therebetween. In the present instance, as may be seen in FIG. 11, Sheet 4, the insert 80 has a tubular neck 81 telescopically received in the registering bores 63 of the plates 62 and 62a, and the insert 80 has a flange 82 extending outwardly from the neck 81 and between the plates 62 and 62a. Sealing rings 78 are mounted around the neck, and a fluidtight connection is effected by bolts 85 passing through the plates 62 and 62a and the flange 82 to compress the ring. To accommodate the flange 82, it is to be noted that each of the plates 62 and 62a is thinner than the plates 70 and 70a on the dry uprights by an amount which corresponds to substantially one half the thickness of the flange 82. Likewise, the bearing plates 71 on the bottoms of the dry uprights are correspondingly thinner than the bearing plate 65 on the wet upright. When stacked and properly assembled, the flange 82 may be observed to ensure the presence of a fluidtight coupling before the system is pressurized. The differences in thickness of the plates enables uprights of standard length to be used in fabricating the structure to thereby effect manufacturing economies.

The storage structure may be slightly displaced, for example when struck by a lift truck during loading. In accordance with the present invention, flexible connecting means is provided to connect the conduit 60 to the warehouse sprinkler system or other supply of fire-retardant substance. To this end, a supply coupling 100 (FIG. 11) is provided for the upper end of the conduit 60, and a length of flexible hose 74 carrying fittings on each end is provided to connect the coupling 100 to a sprinkler header 73. As may be seen in FIG. 11, the coupling 100 includes a flange plate 101, similar to the plates 62 and 62a, and having a bore around which an externally threaded nipple 102 is welded. The coupling 100 is connected to the upper end of the web column 14 in the same manner as the stacking of the columns 14 with the use of an insert 80, sealing rings 78 and bolts 85. When the conduit 60 is connected to the header 73 through the flexible hose 74, the structure may be displaced slightly without breaking the connection to cause leakage of water or other fire-retardant substance.

The storage structure of the present invention is resistant to inhabitation by vermin. For this purpose, the access holes 30 are closed by knockouts 30a. For purposes of illustration, the knockouts 30a are shown offset from the face of the web; however, it is preferable for the knockouts 30a to be disposed flush with the face of the web 14a. This may be effected during the manufacturing process in the usual manner, by displacing the knockouts 30a back into the plane of the web after they have been partially sheared. After painting, the backrolled knockouts 30a seal the interior of the columns against access, and provide a relatively smooth outside surface for the webs 14a, thereby eliminating any areas in which vermin may find refuge.

In order to close unused holes 30 which occur, for example, when the beams are removed and remounted at different vertical locations on the uprights, closure means is provided. In the present instance, the closure means includes a removable resilient plug 110 (FIGS. 2 and 3) capable of insertion into any open hole 30. The plates mounted on the tops and bottoms of the tubular uprights seal off their interiors and the clips 27 completely close the ends of the load beams 16. In addition, a sealing agent, for example caulking or other sealing compound 115 (FIG. 7, Sheet 3), is applied around the apertures through which the taps 54 protrude. In this manner, access by vermin into the interior of the uprights and beams is prevented, and recesses or other places in which vermin may find sanctuary are eliminated.

In view of the foregoing, it should be apparent that a novel storage structure which possesses fire-resistant as well as vermin-resistant features has now been provided. Also, the present invention provides a storage structure having improved means for releasably locking beams onto uprights in a manner which increases the safety of the structure.

While preferred embodiments of the present invention have been described in detail, various modifications, alterations or changes may be made without departing from the spirit and scope of the present invention as defined in the appended claims.

What is claimed is:

1. In a storage structure having at least two uprights and a crossbeam releasably and adjustably mounted on said uprights, each of said uprights having a front web plate and means including holes providing access at spaced intervals into the interior of the upright through the web plate; the improvement comprising: a support clip mounted on each end of said beam for engaging said upright and spanning across said access means, at least one bearing pin protruding from said clip and snugly engaging in one of said holes, primary locking means rotatably carried on said clip for projecting through a selected one of said access holes and engaging the interior of said web plate upon rotation for releasably securing said beam thereto, said primary locking means including a locking device having a shank journaled in said clip, an eccentrically offset head on one end of said shank for engaging said web plate interior upon rotation of said shank, and an arm on the other end of said shank for rotating said shank to cause said head to selectively engage and disengage said web plate interior, and secondary locking means carried on said clip and projecting through a selected other one of said access holes, said secondary locking means including a locking pin with a shoulder, said locking pin being offset with respect to its associated hole by a distance corresponding substantially to the radial dimension of said shoulder, said clip having an edge spaced from said locking shoulder with said edge being engageable against the outside of said front flange and said locking shoulder being engageable against the inside thereof to enable said clip and beam to be inclined with respect to said upright thereby to facilitate connection and disconnection of the beams and the uprights, said locking shoulder being engageable against the inside of the front flange after snug engagement of the bearing pin in its associated hole and when the beam is torqued on its longitudinal axis.

2. Apparatus according to claim 1 wherein said primary locking means includes a resilient arm on the outside of said clip for rotating said primary locking means, said arm having an inturned free end portion releasably engageable in keeper means carried by said locking-pin to thereby prevent inadvertent rotation of said primary locking means.

3. Apparatus according to claim 2 wherein said locking device has a base portion on said shank disposed on the exterior of said clip, and including a retainer having a bifurcated portion engaging said base portion to limit the axial displacement of said shank on said clip, said bifurcations being disposed to limit transaxial displacement of said shank, and means to secure said retainer to said clip, whereby said locking device is secured against inadvertent disengagement from the clip on the end of the beam.

4. Apparatus according to claim 3 wherein said retainer comprises a spring element having a bifurcated portion disposed on opposite sides of said shank and between said clip and said base portion, said spring element being flexible intermediate said mounting means and said shank to enable said shank to be displaced axially and its head to clear the front of said clip and said bifurcations on said element being disposed to permit transaxial displacement of said shank in a direction to allow removal of the locking device from the clip.

5. A storage structure comprising:
end frames each having a pair of hollow closed tubular uprights with each upright having a web plate and a pair of side flanges integral with said web plate,
at least one hollow closed tubular beam spanning between said end frames,
closure means extending across the tops and bottoms of said uprights and across the ends of said beam to close the interiors thereof,
removable means providing access openings into the interior of said uprights at spaced intervals along their lengths, said access-providing means being formed in said web plate and including a series of holes disposed in parallel rows and knockouts within said holes,
a support clip mounted on each end of said beam for engaging said upright and spanning across at least one row of said access means, said support clip engaging flush against said web plate, and
locking means carried on each support clip to protrude through open ones of said access openings and engage the interior of said uprights for releasably securing said beam thereto, said knockouts being located with respect to the plane of the web to provide a substantially smooth outer surface, whereby the closed tubular elements of said storage structure are resistant to infiltration and inhabitation by vermin and whereby the beam may be mounted in different vertical locations upon removal of said knockouts from selected holes.

6. A structure according to claim 5 wherein said access providing means includes a removable resilient plug to close said selected holes.

7. A structure according to claim 5 wherein the side flanges of at least one of said uprights have inturned lips coextensive in length therewith and disposed in edgewise abutting relation to form said column with a rectangular tubular cross section, and including means spanning across said abutting lips to maintain said lips in said relation and to close the interior of said upright.

8. A structure according to claim 7 including bracing extending between adjacent uprights in said end frames and secured to said lips to form a free-standing structure, and said lip-spanning means including a layer of sealing material.

* * * * *